United States Patent
Hasegawa et al.

(10) Patent No.: US 7,887,121 B2
(45) Date of Patent: Feb. 15, 2011

(54) PEDESTRIAN PROTECTION APPARATUS FOR VEHICLE

(75) Inventors: Kazutoshi Hasegawa, Toyota (JP);
Yuichiro Fukakusa, Nagoya (JP);
Yoshihiro Ogura, Toyota (JP); Kuniaki Hasegawa, Kariya (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 139 days.

(21) Appl. No.: 12/411,479

(22) Filed: Mar. 26, 2009

(65) Prior Publication Data

US 2009/0267369 A1 Oct. 29, 2009

(30) Foreign Application Priority Data

Apr. 25, 2008 (JP) .............................. 2008-115252

(51) Int. Cl.
*B60R 21/34* (2006.01)
(52) U.S. Cl. .................. 296/187.04; 293/132
(58) Field of Classification Search ........... 296/187.04, 296/187.09; 293/15, 120, 132, 133, 122, 293/121
See application file for complete search history.

(56) References Cited

U.S. PATENT DOCUMENTS

| | | | | |
|---|---|---|---|---|
| 3,871,636 A | * | 3/1975 | Boyle | ......................... 267/140 |
| 6,540,275 B1 | * | 4/2003 | Iwamoto et al. | ................ 293/24 |
| 6,893,064 B2 | | 5/2005 | Satou | |
| 7,059,642 B2 | * | 6/2006 | Ohno et al. | .................. 293/120 |
| 7,441,828 B2 | * | 10/2008 | Noyori et al. | .......... 296/187.04 |
| 7,516,994 B2 | * | 4/2009 | Ito | .............. 293/133 |
| 7,575,271 B2 | * | 8/2009 | Hasegawa et al. | ....... 296/187.04 |
| 7,597,383 B2 | * | 10/2009 | Itou et al. | .............. 296/187.04 |
| 7,699,383 B2 | * | 4/2010 | Fukukawa et al. | ..... 296/187.04 |
| 2008/0093868 A1 | * | 4/2008 | Steller | .......................... 293/142 |
| 2009/0167037 A1 | * | 7/2009 | Czopek et al. | .............. 293/120 |

FOREIGN PATENT DOCUMENTS

| | | |
|---|---|---|
| EP | 1 238 862 A2 | 9/2002 |
| EP | 1 867 525 A2 | 12/2007 |
| JP | 2000-006739 A1 | 1/2000 |

* cited by examiner

*Primary Examiner*—Glenn Dayoan
*Assistant Examiner*—Pinel E Romain
(74) *Attorney, Agent, or Firm*—Burr & Brown

(57) ABSTRACT

A pedestrian protection apparatus is provided which prevents occurrence of bending deformation resulting from thermal contraction after the molding of a resin base member. The apparatus includes a resin base member that is fixed to a vehicle at a rear portion thereof and a plurality of reinforcing beads that extend in a front to back direction of the vehicle and space apart from each other in a vehicle width direction at a front portion of the base member. On a portion of the base member positioned between mutually adjacent ones of these reinforcing beads is integrally formed a planar connecting rib extends in a direction perpendicular to an extending direction of the reinforcing beads, so that mutually opposing surfaces of the adjacent reinforcing beads are connected to each other by the connecting rib.

14 Claims, 6 Drawing Sheets

PEDESTRIAN PROTECTION APPARATUS FOR VEHICLE

The present application is based on Japanese Patent Application No. 2008-115252 filed on Apr. 25, 2008, the contents of which are incorporated herein by reference.

BACKGROUND OF THE INVENTION

1. Field of the Invention

The present invention relates to a pedestrian protection apparatus for a vehicle, and in particular to an improved structure of the pedestrian protection apparatus disposed at a lower region of a front part of the vehicle and arranged to apply a counterforce to a leg portion of a pedestrian by contact with the leg portion of the pedestrian that has collided or contacted with a front face of the vehicle, thereby protecting the leg portion of the pedestrian.

2. Description of the Related Art

In vehicles such as automobiles, there are conventionally disposed, at a front face, a rear face, or side faces, of the vehicles, various types of protection apparatuses which absorb an impact energy generated upon a collision, for thereby protecting the vehicle body and vehicle passengers. In recent years, there is also disposed, at the front face of the vehicle, an apparatus for protecting a pedestrian upon collision (contact) of the pedestrian with the front face of the vehicle.

As one type of the pedestrian protection apparatuses, there is known an apparatus which is disposed inside of a front bumper or at a lower part of the front bumper independently of the front bumper. The apparatus is arranged to apply, to a leg portion of the pedestrian, a counterforce with respect to an impact load that is inputted upon collision of the pedestrian with the front face of the vehicle, thereby causing the pedestrian to be thrown toward a member such as a hood that can absorb the impact. Thus, it is possible to assure protection and safety of the pedestrian.

Various structures of the pedestrian protection apparatuses are conventionally proposed. For example, U.S. Pat. No. 6,893,064 discloses a pedestrian protection apparatus including a resin base member that is disposed in a lower region of a front part of a vehicle so as to extend in a front to back direction of the vehicle and fixed to the vehicle at a rear portion thereof and a plurality of reinforcing beads that is integrally formed at a plurality of positions spaced apart from each other in a vehicle width direction at a front portion of the base member so as to extend in a front to back direction of the vehicle. The reinforcing beads have an angular U-shape in cross section protruding at least one of upward and downward. The apparatus is configured to apply a counterforce to a leg portion of a pedestrian that has collided with the front of the vehicle by contact of a front end part of the base member with the leg portion of the pedestrian, thereby protecting the pedestrian.

The pedestrian protection apparatus having such a structure can achieve sufficient weight reduction and excellent moldability because it is formed of an integrally-molded resin product. Further, while keeping the height of the reinforcing beads relatively small, the front portion of the base member can have substantially the same rigidity as the rigidity that would be achieved, for example, when a high planar rib is integrally formed. Therefore, desired pedestrian protection performance can be advantageously exhibited with a compact structure.

However, the inventors of the present invention studied the conventional pedestrian protection apparatuses equipped with reinforcing beads from various aspects and found that, because such a pedestrian protection apparatus is formed of an integrally-molded resin product including the base member and the plurality of reinforcing beads, the entire apparatus sometimes suffer from bending deformation (warping deformation) due to thermal contraction occurring inevitably after the molding of such an integrally-molded product.

That is, in the conventional pedestrian protection apparatuses equipped with reinforcing beads, generally, the base member extending in the vehicle width direction has a front end surface with a convex curved configuration protruding to the front of the vehicle. However, the thermal contraction after the molding sometime causes a phenomenon in which the entire apparatus bends (warps) such that the radius of curvature of the front end surface of the base member is increased. If this happens, it not only makes installation of the base member to the lower region of the front face of the vehicle difficult, but also may deteriorate the pedestrian protection performance, depending on the deformed condition.

SUMMARY OF THE INVENTION

The present invention was made in the light of the above-described situations. It is therefore an object of the present invention to provide an improved structure of a pedestrian protection apparatus having a resin base member with a plurality of reinforcing beads integrally formed at a front portion of the base member, that is capable of effectively preventing occurrence of bending deformation resulting from thermal contraction after molding.

To achieve the object, the inventors of the present invention first studied the source of bending deformation due to thermal contraction after molding. The inventors of the present invention proceeded with the study of conventional pedestrian protection apparatuses equipped with reinforcing beads in which bending deformation occurs, focusing on the following:

a) a reinforcing rib extending in the vehicle width direction is provided at a front end part of the base member with an aim to increase its rigidity, and a plurality of reinforcing beads are integrally formed to extend from a rear end surface of the reinforcing rib to the back side of the vehicle, for example as shown in U.S. Pat. No. 6,893,064;

b) a large angular U-shaped notch may be provided in a rear portion of the base member in some cases; and c) the reinforcing beads have an angular U-shaped cross section with two side walls and a connecting wall connecting the two side walls, and the reinforcing beads are provided such that respective side walls of any mutually adjacent reinforcing beads are spaced apart from each other in the vehicle width direction while being positioned opposite each other, so that thermal contraction after molding causes the respective side walls of mutually adjoining reinforcing beads to deform such as to incline or fall over diagonally towards a direction in which end portions on the side of the connecting wall (open side of the angular U-shape) approach each other (inward in the opposing direction). As a result, it was deduced that, in the conventional pedestrian protection apparatuses equipped with reinforcing beads, because of the reinforcing rib and notch provided in the base member, during the thermal contraction after molding, each side wall of the reinforcing beads is deformed to incline on a rear end side thereof at a larger angle relative to the vertical direction than on a front end side thereof, which result in a bending deformation that increases the radius of curvature of the front end surface of the base member. Based on this deduction, the inventors of the present invention further studied to eliminate the source of bending deformation caused by thermal contraction after molding. As a result, the present invention was completed.

The above-indicated object of the invention may be attained according to a principle of the invention, which provides a pedestrian protection apparatus for a vehicle, comprising: a resin base member which is disposed at a lower region of a front of the vehicle so as to extend in a front to back direction of the vehicle, which includes a front portion and a rear portion and is fixed at the rear portion to the vehicle; a plurality of reinforcing beads integrally formed at the front portion of the resin base member so as to be spaced apart from each other by a predetermined distance in a vehicle width direction, the plurality of reinforcing beads being extended in the front to back direction of the vehicle and having an angular U-shaped cross section that protrudes at least one of upward and downward; the apparatus being arranged to protect a leg portion of a pedestrian that has collided with the front of the vehicle by contact of a front end of the resin base member with the leg portion of the pedestrian, wherein at least one planar connecting rib is vertically provided on a portion of the resin base member that is positioned between any adjacent reinforcing beads at the front portion of the resin base member, the at least one planar connecting rib being extended in a direction perpendicular to an extending direction of the reinforcing beads to connect opposing surfaces of the adjacent reinforcing beads.

According to a desirable embodiment of the pedestrian protection apparatus of the present invention, the at least one planar connecting rib has a thickness that is thinner than that of the reinforcing bead. The term "thickness of the reinforcing bead" here means the respective thickness of the two side walls and the connecting wall of each reinforcing bead.

According to a preferable embodiment of the pedestrian protection apparatus of the present invention, the opposing surfaces of the plurality of reinforcing beads adjacent to each other in the vehicle width direction are connected at end portion of the reinforcing beads via the at least one planar connecting rib.

According to an advantageous embodiment of the pedestrian protection apparatus of the present invention, the at least one planar connecting rib comprises a plurality of planar connecting ribs and are provided on the front portion of the resin base member, and wherein the plurality of planar connecting ribs are in alignment with each other in the vehicle width direction.

According to another preferred embodiment of the pedestrian protection apparatus of the present invention, the plurality of reinforcing beads are formed to protrude both of upward and downward at the front portion of the resin base member.

In short, according to the pedestrian protection apparatus of the present invention, the reinforcing beads adjacent to each other in the vehicle width direction are connected to each other by planar connecting ribs at side walls thereof that are positioned opposite each other. Therefore, each connecting rib props each side wall so as not to fall over during thermal contraction after molding, whereby the amount of gradient deformation of each side wall can be made zero or as small as possible. As a result, it can be prevented to the maximum extent possible that the portion on the rear end side of each side wall of the reinforcing beads is deformed to incline more than the portion on the front end side thereof due to thermal contraction after molding.

Accordingly, in the thus constructed pedestrian protection apparatus according to the present invention, occurrence of bending deformation resulting from thermal contraction after molding can be prevented extremely effectively. Thus, the instillation of the base member to the lower region of the front face of the vehicle can be performed always smoothly, and also desired pedestrian protection performance can be ensured more stably.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

To further clarify the present invention, there will be described in detail embodiments of the invention with reference to the drawings.

Figure 1:
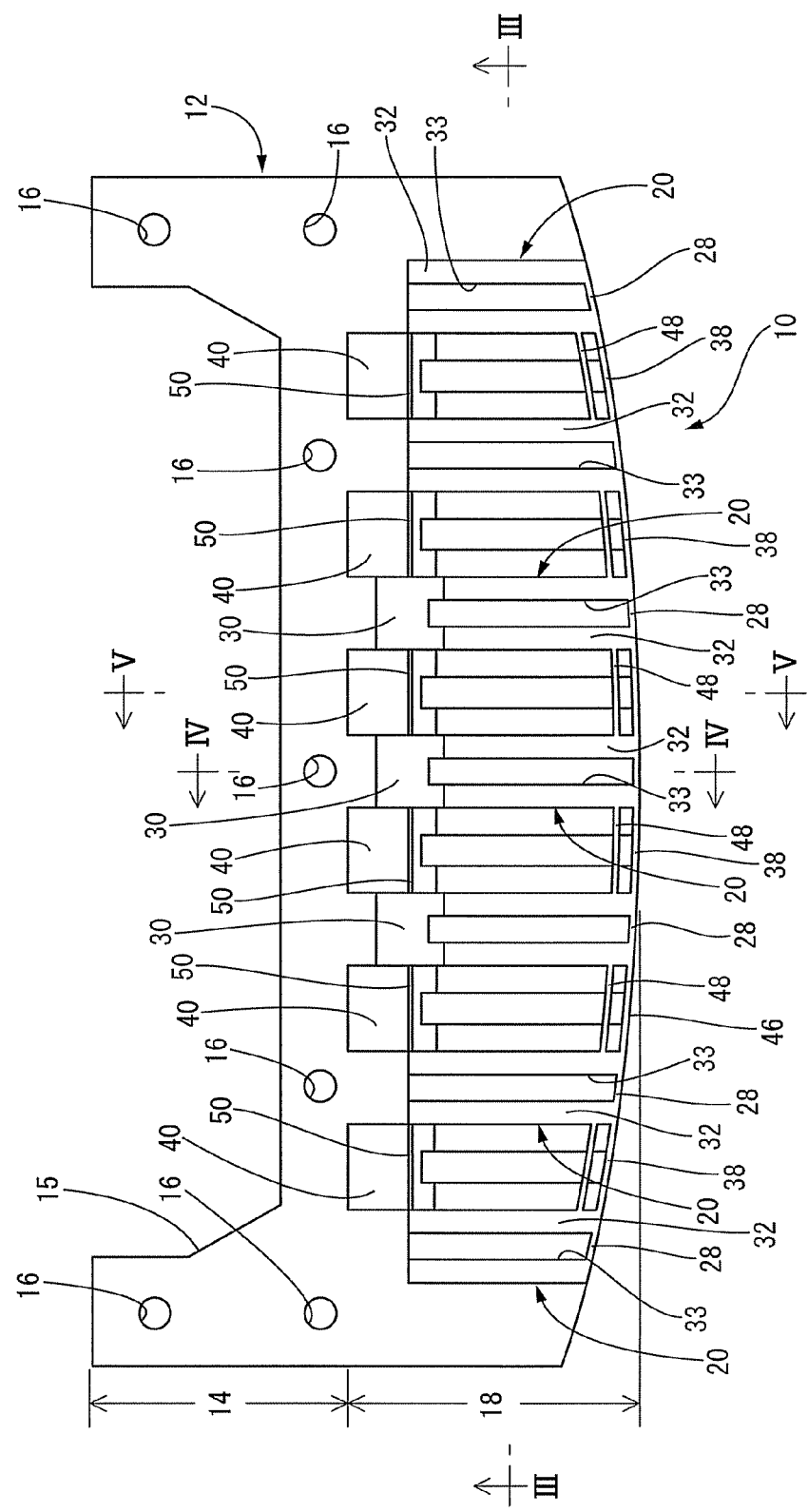
FIG. 1 is an explanatory top plan view showing one example of a pedestrian protection apparatus having a structure according to the present invention.
Figure 2:
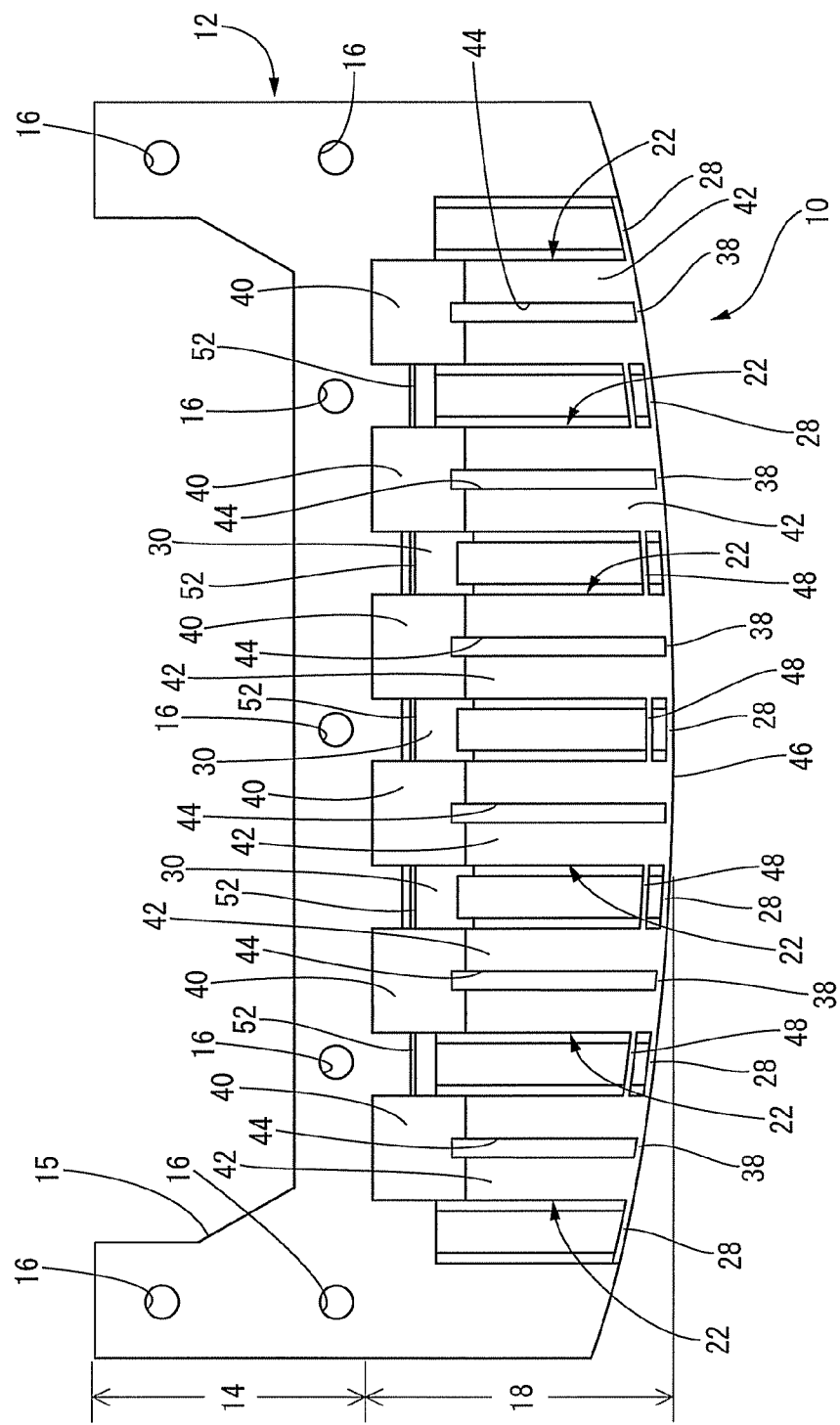
FIG. 2 is an explanatory bottom plan view of the pedestrian protection apparatus shown in FIG. 1.
Figure 3:
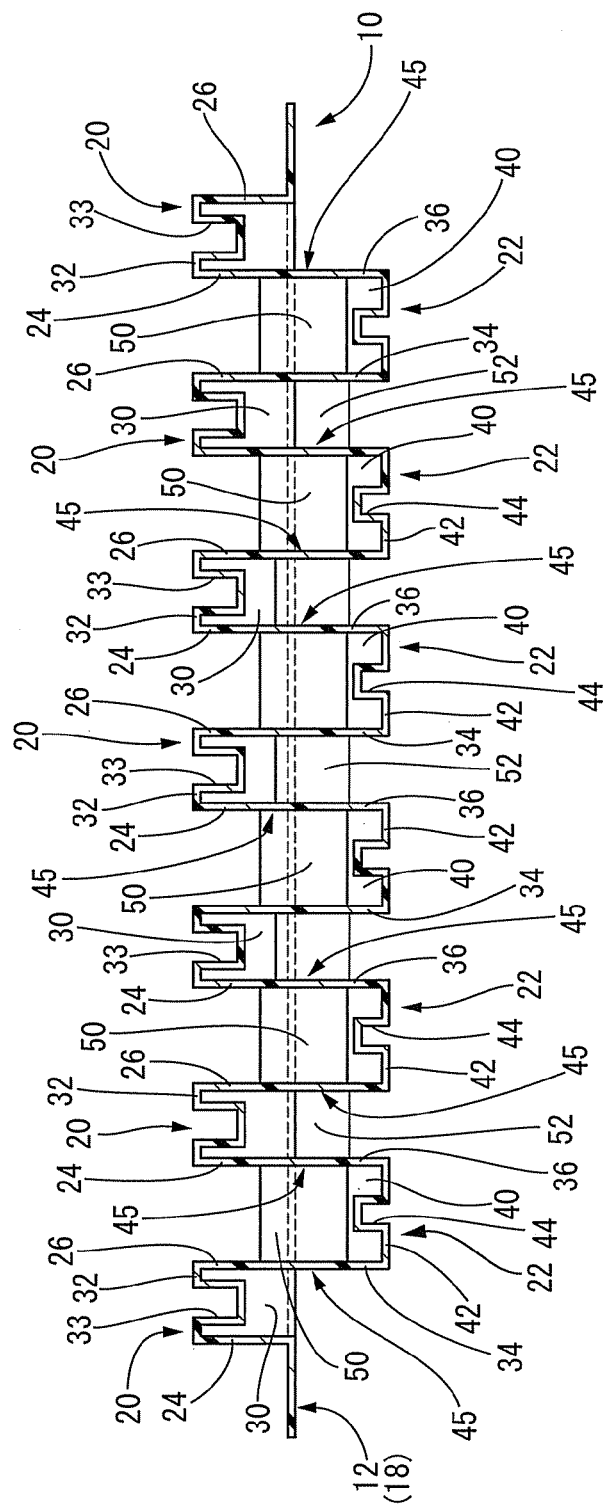
FIG. 3 is an explanatory cross sectional view taken along the line III-III of FIG. 1.

First, FIG. 1 to FIG. 3 schematically show a top plan view, a bottom plan view, and a sectional view, respectively of a pedestrian protection apparatus attached inside of a front bumper installed on a front face of an automobile, which is one embodiment of a pedestrian protection apparatus according to the present invention. As apparent from FIG. 1 to FIG. 3, the pedestrian protection apparatus 10 of this embodiment includes a base plate 12 as a base member.

The base plate 12 is made of, for example, a synthetic resin material such as polypropylene or ABS resin and is constituted by a thin planar plate having a generally elongated-rectangular shape, as a whole. The dimension of the base plate 12 as measured in the width direction of the automobile i.e., as measured in the left-to-right direction of the automobile, under installation of the pedestrian protection apparatus 10 on the automobile, is made smaller than the width of the automobile by a predetermined amount, and the dimension as measured in the front to back direction of the automobile is made sufficiently smaller than the dimension thereof as measured in the left-to-right direction. The left-to-right direction of FIG. 1 corresponds to width direction of the automobile, and the upward and downward direction of FIG. 1 corresponds to the front to back direction of the automobile, respectively. Hereinafter, the above-indicated direction extending in the left-to-right direction of the automobile is referred to as "the left-to-right direction" while the above indicated direction extending in the front to back direction of the automobile is referred to as "the front to back direction".

A rear portion of the base plate 12, which occupies a substantially rear half region thereof is formed as a flat portion 14 which has substantially a flat plate configuration and which includes an upper surface and a lower surface that extend horizontally under installation of the pedestrian protection apparatus 10 on the automobile. A large rectangular notch 15 is formed in this flat portion 14. Thereby, the flat portion 14, and ultimately, the entire base plate 12, has an angular U-shape which includes both side end regions extending from a front portion to a rear side with a sufficient length at both sides in the left-to-right direction of the base plate 12, and an intermediate region extending from the front portion to the rear side with a small length at a middle part in the left-to-right direction of the base plate 12. In both side end regions and in the intermediate region of the angular U-shaped flat portion 14, a plurality of insertion holes 16 into which predetermined fixing bolts or the like can be inserted, are provided such that the insertion holes 16 are spaced apart from each other by a predetermined distance in the left-to-right direction or the front to back direction.

The front portion of the base plate 12, which does not include the flat portion 14, is made as a reinforcing portion 18 having a reinforcing structure. Namely, a plurality of first reinforcing beads 20 (here, seven first reinforcing beads) are respectively integrally formed to protrude upward in an intermediate region, which does not include both of the left and right side regions, of the reinforcing portion 18. Further, a plurality of second reinforcing beads 22 (here, six second reinforcing beads) are respectively integrally formed to protrude downward in the intermediate region of the reinforcing portion 18. Accordingly, the reinforcing portion 18 is provided with a sufficient reinforcing structure.

More specifically, as apparent from FIG. 1 to FIG. 4, each of the first reinforcing beads 20 has a substantially angular U-shaped cross section protruding upward (see FIG. 3), and integrally includes: left and right side walls 24 and 26 extending parallel to the front to back direction; front and rear side walls 28 and 30 positioned opposite each other in the front to back direction; and upper connecting walls 32 connecting these four side walls 24 to 30. These five walls 24 to 32 are all formed of a flat plate having substantially the same thickness as the thickness of the flat portion 14 of the base plate 12 and thickness of the portions of the reinforcing portion 18 other than the formation portion of the first and second reinforcing beads 20, 22.

Thus, each first reinforcing bead 20 as a whole has an elongated rectangular box-like configuration protruding upward and extending straight in the front to back direction with a constant height. In other words, each first reinforcing bead 20 has a channel-like configuration that extends straight in the front to back direction with an angular U-shaped cross section which is taken along the vehicle width direction and which is open downward. Moreover, each first reinforcing bead 20 includes a channel 33 which is open upward and has a rectangular cross section in a central region in the width direction (left-to-right direction) of the upper connecting walls 32, such that it extends continuously over the entire length. Accordingly, strength of the first reinforcing beads 20 is improved.

Separate ones of these first reinforcing beads 20 are arranged parallel to each other in the intermediate region of the reinforcing portion 18 so as to protrude upward, with each left side wall 24 and each right side wall 26 being opposite and spaced apart from each other by a predetermined distance in the left-to-right direction. That is, the seven first reinforcing beads 20 protruding upward are integrally formed in the intermediate region of the reinforcing portion 18 such that they are spaced apart from each other by a predetermined distance in the left-to-right direction, such as to extend straight in the front to back direction with their left side walls 24 and right side walls 26 opposing to each other.

In these seven first reinforcing beads 20, the rear side walls 30 of two first reinforcing beads positioned on the left side and the rear side walls of two first reinforcing beads positioned on the right side, in the intermediate region of the reinforcing portion 18, extend in the vertically upward direction from rear end parts of the intermediate region of the reinforcing portion 18 and are connected to rear-side edges of the upper connecting walls 32. Each rear side wall 30 of three first reinforcing beads 20 positioned in the center in the left-to-right direction on the intermediate region of the reinforcing portion 18 extends obliquely upward from the rear end parts of the intermediate region of the reinforcing portion 18 to the front side, to be connected to the rear-side edges of the upper connecting walls 32. Further, the front side wall 28 of each first reinforcing bead 20 is protruded downward from the reinforcing portion 18 to the same height as a protruding height of the second reinforcing beads 22. Thereby, the overall height of the front side wall 28 of the first reinforcing bead 20 is made equal to the sum of the heights of the first reinforcing bead 20 and the second reinforcing bead 22.

As shown in FIG. 1 to FIG. 3 and FIG. 5, each of the second reinforcing beads 22 has an angular U-shaped cross section protruding downward (see FIG. 3), and integrally includes left and right side walls 34 and 36 extending parallel to the front to back direction, front and rear side walls 38 and 40 positioned opposite each other in the front to back direction, and lower connecting walls 42 connecting these four side walls 34 to 40. These five walls 34 to 42 are all formed of a flat plate having substantially the same thickness as the respective thickness of the left, right, front, and rear side walls 24 to 30 and the upper connecting walls 32 of the first reinforcing beads 20.

Thus, each second reinforcing bead 22 as a whole has an elongated rectangular box-like configuration protruding downward oppositely from the protruding side of the first reinforcing beads 20 and extending straight in the front to back direction with a constant height. In other words, each second reinforcing bead 22 has a channel-like configuration that extends straight in the front to back direction and is open upward, and substantially angular U-shaped cross section which is taken along the vehicle width direction. In the second reinforcing beads 22, similarly to the first reinforcing beads 20, in a central region in the width direction (left-to-right direction) of the lower connecting walls 42, a channel 44 opening downward and having a rectangular cross section is formed so as to extend continuously over the entire length. Accordingly, strength of the second reinforcing beads 22 is improved.

These second reinforcing beads 22 are arranged parallel to each other in the intermediate region of the reinforcing portion 18 so as to protrude downward, with a left side wall 34 and a right side wall 36 of separate second reinforcing beads 22 being opposite and spaced apart from each other by a predetermined distance in the left-to-right direction, such that each of the second reinforcing beads 22 is positioned between any two first reinforcing beads 20 adjacent to each other in the left-to-right direction. That is, the six second reinforcing beads 22 protruding downward are integrally formed in the intermediate region of the reinforcing portion 18 such that they are spaced apart from each other by a predetermined distance in the left-to-right direction, such as to extend straight in the front to back direction with their left side walls 34 and right side walls 36 opposing to each other. Thereby, the first reinforcing beads 20 and second reinforcing beads 22 are provided in the intermediate region of the reinforcing portion 18 such that they are alternately positioned in the left-to-right direction.

In the present embodiment, each left side wall 24 of the first reinforcing beads 20 and each right side wall 36 of the second reinforcing beads 22 are configured by a single wall, and each right side wall 26 of the first reinforcing beads 20 and each left side wall 34 of the second reinforcing beads 22 are configured by a single wall, except for the left side wall 24 of the first reinforcing bead 20 positioned at the leftmost end and the right side wall 26 of the first reinforcing bead 20 positioned at the rightmost end.

Specifically, in the intermediate region of the reinforcing portion 18, a plurality of vertical walls 45 are provided opposite each other in the left-to-right direction so as to extend in both upward and downward directions to the same height as the respective height of the first reinforcing beads 20 and second reinforcing beads 22, and also extend straight in the front to back direction with the same length as the respective length of the first reinforcing beads 20 and second reinforcing beads 22. An upper region of each vertical wall 45 positioned above the flat portion 14 and also positioned above the portion of the reinforcing portion 18 where the first and second reinforcing beads 20 and 22 are not provided constitutes the left and right side walls 24 and 26 of the first reinforcing beads 20, and a lower region of each vertical wall 45 positioned below the portion of the reinforcing portion 18 where the first and second reinforcing beads 20 and 22 are not provided constitutes the left and right side walls 34 and 36 of the second reinforcing beads 22. Further, upper end portions and lower end portions of the adjacent ones of these plurality of vertical walls 45 are alternately connected to each other by the upper connecting wall 32 and the lower connecting wall 42, respectively.

The rear side wall 40 of each second reinforcing bead 22 extends obliquely downward from a rear end part of the reinforcing portion 18 in the intermediate region to the front side so as to be connected to a rear-side edge of the lower connecting wall 42. The front side wall 38 of each second reinforcing bead 22 is protruded upward from the reinforcing portion 18 to the same height as the protruding height of the first reinforcing beads 20. Thereby, the overall height of the front side wall 38 of the second reinforcing bead 22 is made equal to the sum of the heights of the first reinforcing bead 20 and the second reinforcing bead 22, and also equal to the overall height of the front side wall 28 of the first reinforcing bead 20.

Thus, in the pedestrian protection apparatus 10 of this embodiment, the plurality of first reinforcing beads 20 and second reinforcing beads 22, which are reinforced by channels 33 and 44 provided in the upper and lower connecting walls 32 and 42, are integrally and alternately formed at the reinforcing portion 18 of the base plate 12. As a result, sufficient rigidity is imparted to the reinforcing portion 18, i.e., the front portion of the base plate 12, whereby the strength against bending deformation of the reinforcing portion 18 is advantageously enhanced.

Further, in the present embodiment, as apparent from FIG. 1 and FIG. 2, the respective front side walls 28 and 38 of the first reinforcing bead 20 and the second reinforcing bead 22 that are adjacent to each other in the left-to-right direction are connected integrally to each other. Thereby, the front surface of the front side walls 28 of the plurality of first reinforcing beads 20 and the front surfaces of the front side walls 38 of the plurality of second reinforcing beads 22 provide a single continuous surface configuration in plan view, and this continuous surface is made as a curved surface that protrudes frontward. Thus, in the pedestrian protection apparatus 10 of this embodiment, the front surface of each of the front side walls 28 and 38 which has such a protruding curved surface and extend in the left-to-right direction are made as an impact input surface 46 to which an impact is inputted, which is generated, for example, when a pedestrian collides with a front face of the automobile in which the pedestrian protection apparatus 10 is installed.

Moreover, in the pedestrian protection apparatus 10, planar reinforcing ribs 48 protruding upward or downward are integrally provided on a front end part of the reinforcing portion 18. Each of the reinforcing ribs 48 is provided between any two second reinforcing beads 22 adjacent to each other in the left-to-right direction and between any two first reinforcing beads 20 adjacent to each other in the left-to-right direction. Each reinforcing rib 48 has a curved shape protruding frontward and positioned such as to extend parallel to the respective front side walls 38 and 28 of the second reinforcing beads 22 and first reinforcing beads 20. Accordingly, the rigidity of the front end part of the reinforcing portion 18 (front portion of the base plate 12) is further enhanced.

The thus constructed pedestrian protection apparatus 10 is installed on an automobile in the same manner as conventional manner. Specifically, with the base plate 12 arranged horizontally, for example, the front end part of the reinforcing portion 18 of the base plate 12 provided with a plurality of first reinforcing beads 20 and second reinforcing beads 22 is inserted to be positioned inside a bumper cover of a front bumper in a front part of the automobile. Under this state of arrangement, the rear end part of the flat portion 14 is fixed, for example, to a radiator support or the like with fixing bolts or the like inserted into the plurality of insertion holes 16. Accordingly, the pedestrian protection apparatus 10 is installed fixedly in a lower region of the front part of the automobile, with the impact input surface 46 being perpendicular to a direction in which the impact load is input.

Thus, in this pedestrian protection apparatus 10, under installation thereof in the front part of the automobile, a counter force with respect to the impact loads generated by the collision of the leg portion of the pedestrian against the bumper cover of the front bumper is arranged to act on the vicinity of shank of a leg portion of the pedestrian via the bumper cover. At this time, the pedestrian protection apparatus 10 is not readily deformed because the rigidity of the reinforcing portion 18 is sufficiently secured to a higher level by providing the first reinforcing beads 20 protruding upward and the second reinforcing beads 22 protruding downward on the reinforcing portion 18, which is the front portion of the base plate 12. Therefore, the pedestrian that has contacted or collided with the bumper cover is thrown toward the member such as a hood of the automobile that can absorb the impact by the pedestrian protection apparatus 10. Thus, protection and safety of the pedestrian can be effectively achieved.

In the pedestrian protection apparatus 10 of this embodiment, as shown in FIG. 1 and FIG. 2, in particular, first connecting ribs 50 are each positioned between any two adjacent ones of the plurality of first reinforcing beads 20 that are provided to protrude upward at the reinforcing portion 18 of the base plate 12, and these plural first connecting ribs 50 (here, six first connecting ribs) are integrally formed to protrude upward at the reinforcing portion 18. Further, second connecting ribs 52 are each positioned between any two adjacent ones of the plurality of second reinforcing beads 22 that are provided to protrude downward at the reinforcing portion 18, and these plural second connecting ribs 52 (here, five second connecting ribs) are integrally formed to protrude downward at the reinforcing portion 18.

More specifically, as apparent from FIG. 1, and FIG. 4 to FIG. 6, each of the first connecting ribs 50 have a rectangular planar shape and a thickness that is thinner than that of the front and rear side walls 28, 30 and the upper connecting walls 32 of the first reinforcing beads 20. Thereby, although not shown, the thickness of the first connecting ribs 50 is made to be thinner than that of the left and right side walls 24 and 26, which is made equal to the thickness of the front and rear side walls 28 and 30 or the upper connecting walls 32.

Each of such first connecting ribs 50 is integrally formed to protrude upward at the reinforcing portion 18 and positioned between, a rear end part of a right side wall 26 of a first reinforcing bead 20 positioned on the left side, of any two first reinforcing beads. 20 adjacent to each other in the left-to-right direction, and a rear end part of the left side wall 24 of the first reinforcing bead 20 positioned on the right side, such as to extend in a direction perpendicular to these right and left side walls 26 and 24. Each of these first connecting ribs 50 connects the mutually opposing surfaces of the respective rear end parts of the right side wall 26 and the left side wall 24 of the adjacent first reinforcing beads 20.

In other words, each first connecting rib 50 is arranged inside of each second reinforcing bead 22 that has a channel-like configuration opening upward and is positioned between any two of the first reinforcing beads 20 adjacent to each other in the left-to-right direction, such as to extend in a direction perpendicular to the extending direction of each first reinforcing bead 20. Under this state of arrangement, the first connecting rib 50 is integrally formed on the upper surface of the rear side wall 40 extending obliquely downward toward the front side of the second reinforcing bead 22 positioned between the rear end parts of any adjacent first reinforcing beads 20. Accordingly, the rear end parts of the adjacent first reinforcing beads 20 are mutually connected.

Figure 5:
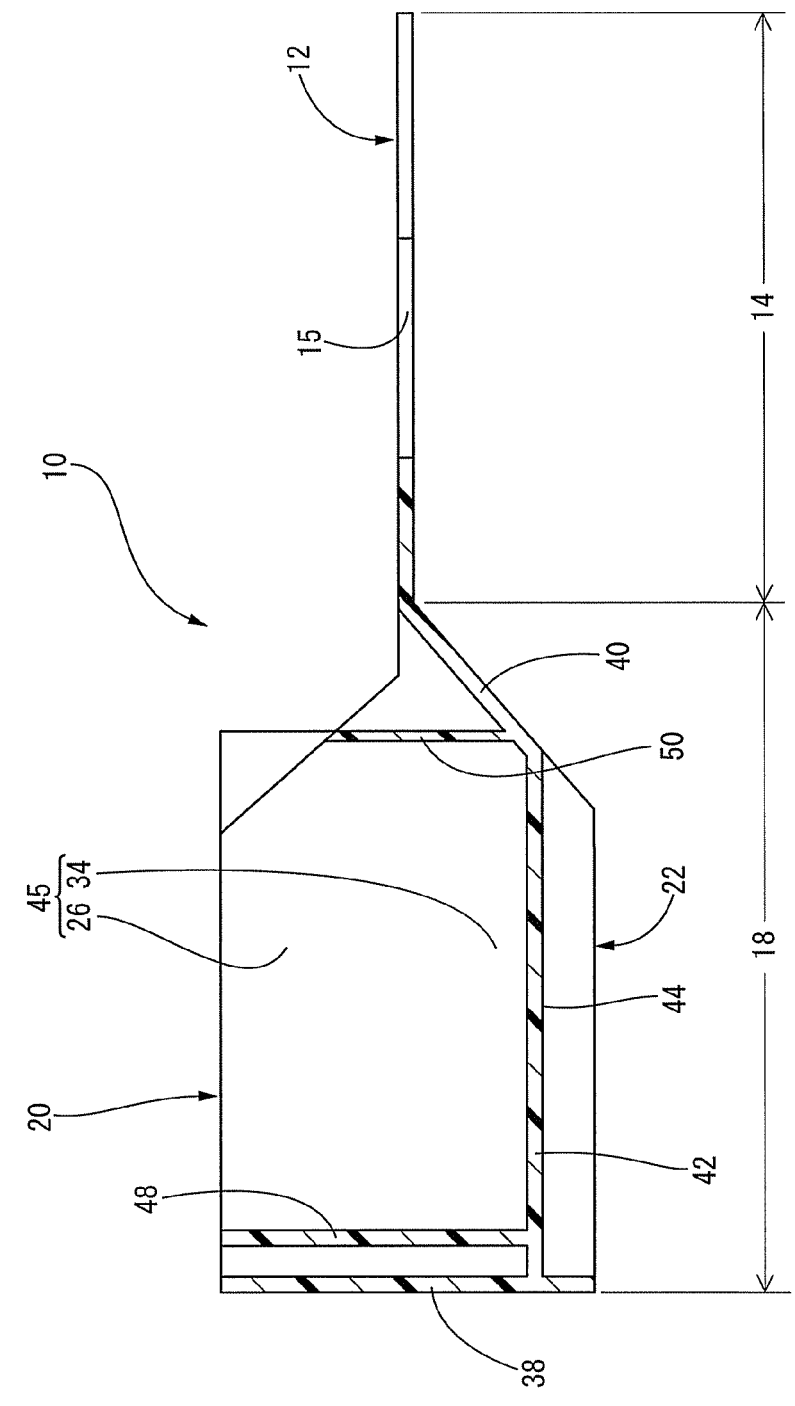
FIG. 5 is an explanatory cross sectional view taken along the line V-V of FIG. 1.

As shown in FIG. 5, while upper ends of the first connecting ribs 50 are positioned lower than an upper surface of the upper connecting walls 32 of the first reinforcing beads 20, the first connecting ribs 50 extend continuously with a sufficient height in the vertical direction, bridging across the right side walls 26 (or left side walls 24) of the first reinforcing beads 20 and the left side walls 34 (or right side walls 36) of the second reinforcing beads 22. That is, the first connecting ribs 50 mutually connect the respective rear end parts of adjacent ones of the plurality of vertical walls 45 that are opposite each other in the left-to-right direction.

Also, as apparent from FIG. 1, in each first reinforcing bead 20 in which the rear side wall 30 extends vertically upward from the reinforcing portion 18 and is connected to the rear-side edge of the upper connecting wall 32, the first connecting rib 50 is connected to a portion of the left side wall 24 or the right side wall 26 that corresponds to the rear-side edge of this upper connecting wall 32.

In each first reinforcing bead 20 in which the rear side wall 30 extends obliquely upward to the front at the reinforcing portion 18 and is connected to the rear-side edge of the upper connecting wall 32, the rear-side edge of the upper connecting wall 32 is positioned more forwardly than that of the first reinforcing beads 20 having the vertically extending rear side walls 30. In such a first reinforcing bead 20 having the rear side wall 30 extending obliquely upward to the front, the first connecting rib 50 is connected to a portion of the left side wall 24 or the right side wall 26 that corresponds to an intermediate portion in the length direction of the rear side wall 30 that is positioned more backwardly than the rear-side edge of the upper connecting wall 32.

Thus, in this embodiment, all of the plurality of first connecting ribs 50 are connected to the rear end parts of the left or right side wall 24 or 26 of each first reinforcing bead 20, in particular, to the portion corresponding to the rear-side edge of the upper connecting wall 32, or to the portion corresponding to a portion positioned more backwardly than the rear-side edge of the upper connecting wall 32. Although the plurality of first reinforcing beads 20 include the rear side walls 30 having different shapes from each other, i.e., there are two types of first reinforcing beads 20 with the portions of the rear end side being shaped differently from each other, the plurality of first connecting ribs 50 are integrally formed to protrude upward at the reinforcing portion 18 such that they are positioned to align along a straight line in the left-to-right direction which is perpendicular to the extending direction of each first reinforcing bead 20.

Figure 4:
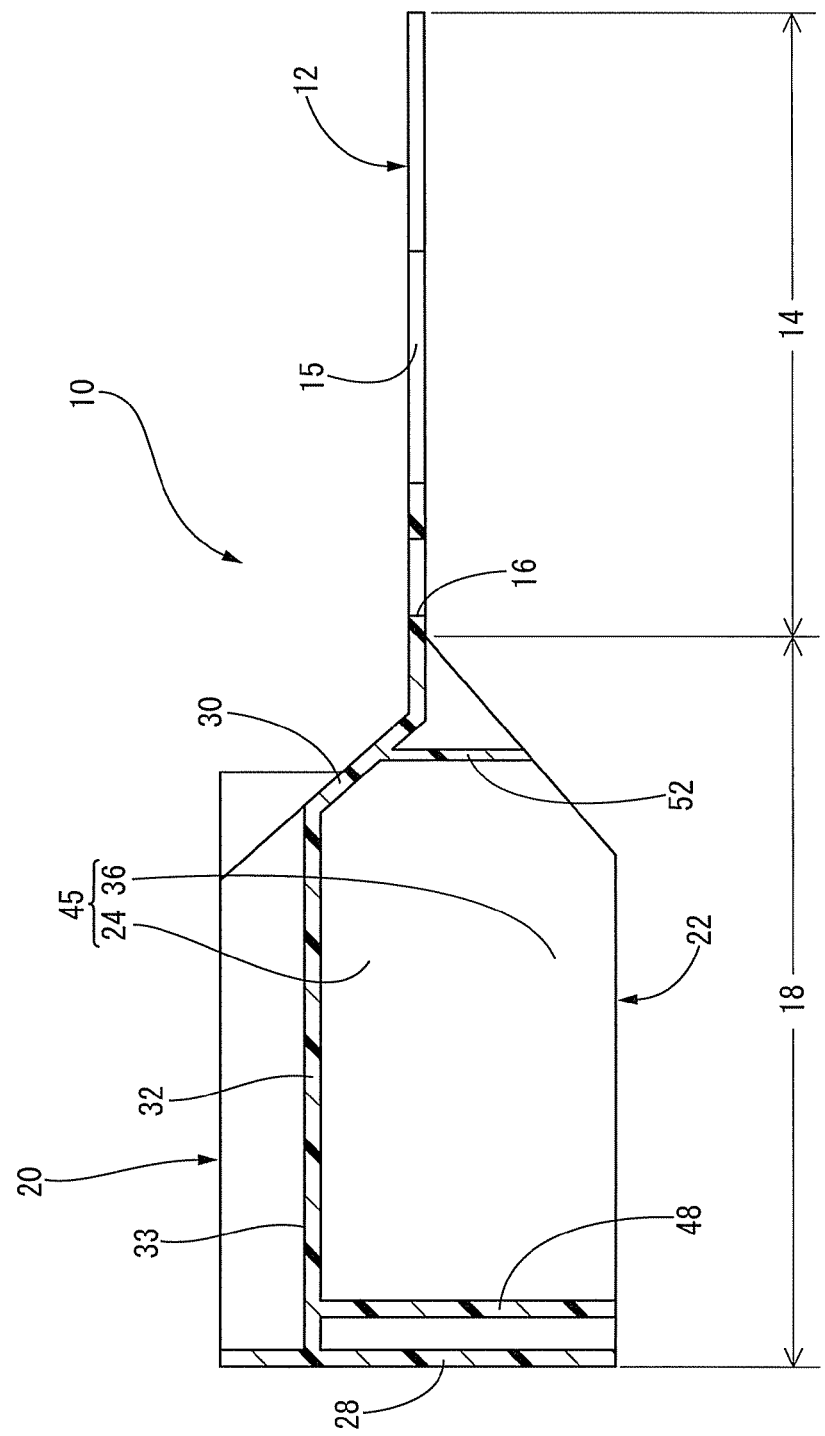
FIG. 4 is an explanatory cross sectional view taken along the line IV-IV of FIG. 1.

Meanwhile, as apparent from FIG. 2 and FIG. 4, the second connecting ribs 52 have a flat rectangular shape like the first connecting ribs 50. The second connecting ribs 52 have a thickness that is thinner than that of the front side walls 38, the rear side walls 40 and the lower connecting walls 42 of the second reinforcing beads 22, and also the thickness of the left and right side walls 34 and 36, which are made to have the same thickness as these.

Each of such second connecting ribs 52 is integrally formed to protrude downward at the reinforcing portion 18, as shown in FIG. 2 and FIG. 3, and positioned between a rear end part of a right side wall 36 of a second reinforcing bead 22 positioned on the left side, of any two second reinforcing beads 22 adjacent to each other in the left-to-right-direction, and a rear end part of the left side wall 34 of the second reinforcing bead 22 positioned on the right side, such as to extend in a direction perpendicular to these right and left side walls 36 and 34. Each of these second connecting ribs 52 connects the mutually opposing surfaces of the respective rear end parts of the right side wall 36 and the left side wall 34 of the mutually adjacent second reinforcing beads 22.

Of these plurality of second connecting ribs 52, as shown in FIG. 2 to FIG. 4, two of second connecting ribs 52, each respectively positioned on either end in the left-to-right direction of the reinforcing portion 18, are integrally formed to protrude downward on the rear side of the reinforcing portion 18 of two of the plurality of first reinforcing beads 20 that are respectively positioned second from the left and second from the right. Of these plurality of second connecting ribs 52, three of them that are positioned in the center of the left-to-right direction of the reinforcing portion 18 are respectively positioned inside of the three first reinforcing beads 20 which are provided in the center in the left-to-right direction of the reinforcing portion 18 and which have a channel-like configuration opening downward, and are integrally formed to protrude on the lower surface of the rear side wall 30 extending and inclining upward to the front of each of these first reinforcing beads 20. Accordingly, the plurality of second connecting ribs 52 mutually connect upper side portions of the rear end parts of vertical walls 45 that are arranged opposite and adjacent to each other in the left-to-right direction, or connect portions extending over upper side and lower side portions of the rear end parts of such vertical walls 45.

In the present embodiment, as described above, all of the plurality of second reinforcing beads 22 have the same rear end part with the rear side wall 40 of the same shape inclining downward to the front side. Each second connecting rib 52 is connected to an intermediate portion in the length direction of the rear side wall 40 of each second reinforcing bead 22, i.e., to part of the left or right side wall 24 or 26 corresponding to the portion spaced by a predetermined distance more backwardly than the rear-side edge of the lower connecting wall 42. Thereby, the plurality of second connecting ribs 52 are integrally formed to protrude downward on the reinforcing portion 18 such that they are positioned to align along a straight line in the left-to-right direction which is perpendicular to the extending direction of each second reinforcing bead 22.

As described above, the pedestrian protection apparatus 10 of this embodiment is made of an integrally-molded resin product including the base plate 12 formed of a thin flat plate having substantially an elongated rectangular shape. On the reinforcing portion 18 that is a front portion of the base plate 12, the plurality of first reinforcing beads 20 protruding upward are integrally formed so as to be positioned adjacent to each other in the left-to-right direction. Further, the plurality of second reinforcing beads 22 protruding downward are integrally formed to be positioned adjacent to each other in the left-to-right direction. The flat portion 14 that is a rear portion of the base plate 12 is provided with a large rectangular notch 15, so that the base plate 12 as a whole has a substantially angular U-shape. Further, in the front end part of the reinforcing portion 18 of the base plate 12, reinforcing ribs 48 are integrally formed to connect the first reinforcing beads 20 together or the second reinforcing beads 22 together which are respectively adjacent to each other in the left-to-right direction.

Figure 6:
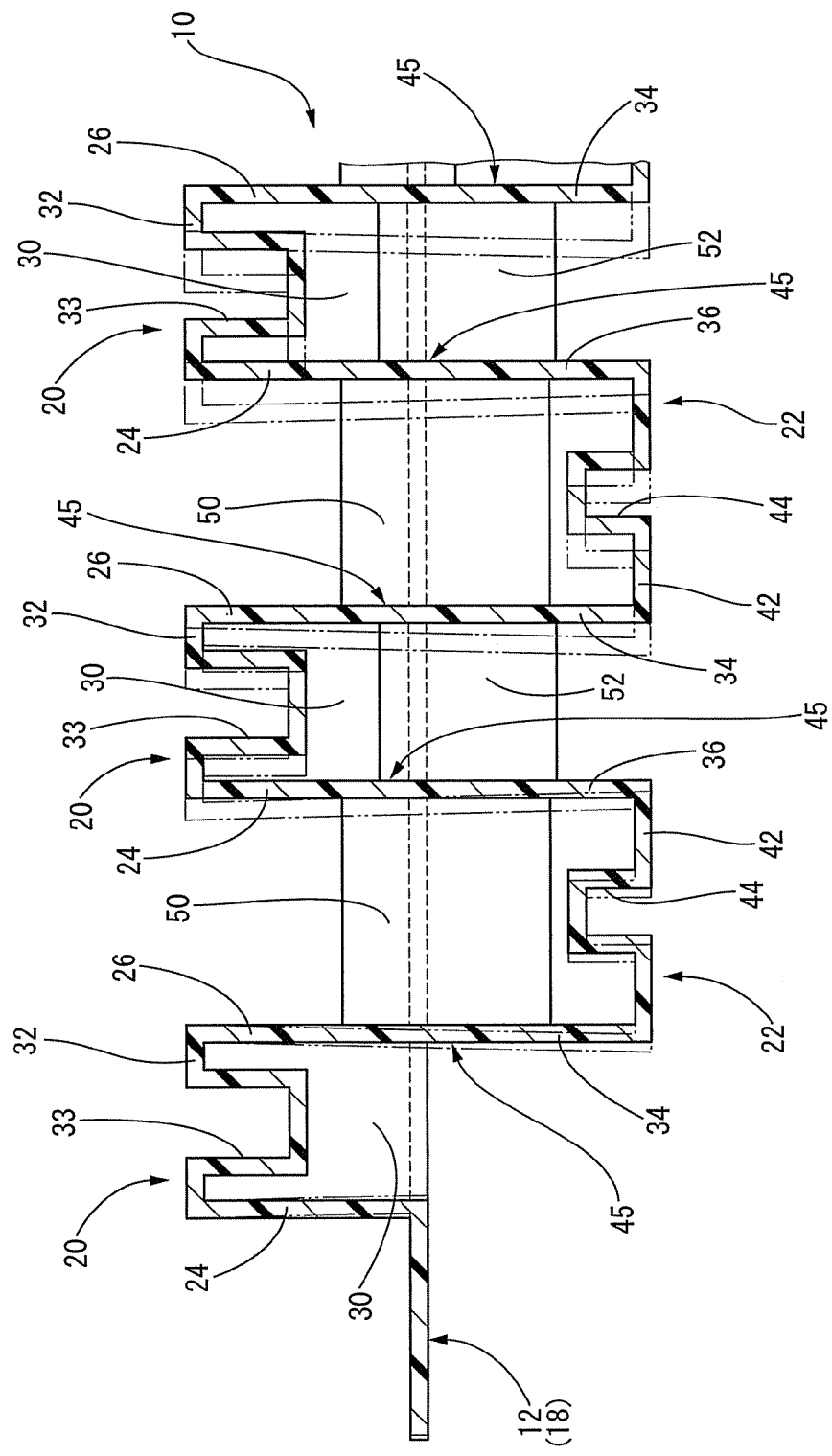
FIG. 6 is a partly enlarged explanatory view of FIG. 3.

Therefore, in the pedestrian protection apparatus 10 made of such a resin-molded product, due to thermal contraction induced inevitably after the molding thereof, the mutually opposing left side wall 24 and the right side wall 26 of adjacent first reinforcing beads 20 exhibit a deformation behavior in which they deform to incline diagonally towards the side in which their upper ends approach each other (inward in the opposing direction), for example as shown by two-dot-chain lines in FIG. 6. Similarly, the mutually opposing left side wall 34 and right side wall 36 of adjacent second reinforcing beads 22 exhibit a deformation behavior in which they deform to incline diagonally towards the side in which their lower ends approach each other (inward in the opposing direction). That is, the above-mentioned plurality of vertical walls 45 exhibit a deformation behavior in which they deform to incline such that the angles made between themselves and the upper or lower connecting walls 32 or 42 are respectively made smaller. The deformation behavior of these left and right side walls 24, 34, 26, and 36 (vertical walls 45), in particular, tends to be large in a rear portion than a front portion thereof. It should be understood that the thermally contracted state of the pedestrian protection apparatus 10 shown by two-dot-chain lines in FIG. 6 is a more thermally contracted state than the actual one, i.e., it is illustrated with exaggeration.

However, in the pedestrian protection apparatus 10 of this embodiment, the rear end parts of the right side walls 26 positioned on the left side and the left side walls 24 positioned on the right side, respectively, of any two first reinforcing beads 20 adjacent to each other in the left-to-right direction, are connected to each other by the planar first connecting ribs 50 extending in a direction perpendicular to these left and right side walls 24 and 26. Similarly, the rear end parts of the right side walls 36 positioned on the left side and the left side walls 34 positioned on the right side, respectively, of any two second reinforcing beads 22 adjacent to each other in the left-to-right direction, are connected to each other by the planar second connecting ribs 52 extending in a direction perpendicular to these left and right side walls 34 and 36.

Therefore, in this pedestrian protection apparatus 10, during thermal contraction after the molding, the first connecting ribs 50 and the second connecting ribs 52 function extremely effectively as prop members between the left side walls 24 and 34 and the right side walls 26 and 36, serving to suppress the gradient deformation of these left and right side walls 24, 34, 26, and 36. Thereby, the amount of gradient deformation of the left and right side walls 24, 34, 26, and 36 during thermal contraction after the molding can be made zero or as small as possible. As a result, the portions on the rear end side of the left and right side walls 24, 34, 26, and 36 of the first and second reinforcing beads 20 and 22 can be prevented from being deformed to incline more largely than the portions on the front end side due to the thermal contraction after the molding.

Accordingly, the thus constructed pedestrian protection apparatus 10 of this embodiment is effective to prevent occurrence of a bending deformation in which the entire base plate 12 is bent such that the radius of curvature of the impact input surface 46 is increased by the thermal contraction after the molding. In addition, misalignment in the attachment position of the flat portion 14 relative to the lower region of the front part of the automobile resulting from such bending deformation is prevented, whereby installation operation of the pedestrian protection apparatus 10 to the lower region of the front part of the automobile is performed always smoothly. Moreover, the desired pedestrian protection performance that should be secured by the pedestrian protection apparatus 10 is prevented from being deteriorated by the bending deformation due to the thermal contraction after the molding.

In the pedestrian protection apparatus 10 of this embodiment, in particular, the first connecting ribs 50 that mutually connect the first reinforcing beads 20 together and the second connecting ribs 52 that connect the second reinforcing beads 22 together are integrally formed at the reinforcing portion 18 so as to protrude upward and downward, respectively. Therefore, as compared to the case in which only the first connecting ribs 50 protruding upward are provided at the reinforcing portion 18 or in which only the second connecting ribs 52 protruding downward are provided at the reinforcing portion 18, the gradient deformation of the left and right side walls 24, 34, 26, and 36 during thermal contraction after the molding can be more advantageously suppressed. As a result, occurrence of bending deformation due to thermal contraction after the molding can be prevented even more effectively.

In this pedestrian protection apparatus 10, the first connecting ribs 50 and the second connecting ribs 52 connect the rear end parts of the first reinforcing beads 20 and the rear end parts of the second reinforcing beads 22. Of these rear end parts, in particular, the first reinforcing beads 20 and the second reinforcing beads 22 are connected to each other at portions positioned at the rear-side edges of the upper and lower connecting walls 32 and 42 of both reinforcing beads 20 and 22, or at portions positioned more backwardly than that. Therefore, it is possible to more effectively stop the portions on the rear end side of the left and right side walls 24, 34, 26, and 36 of the first and second reinforcing beads 20 and 22 from deforming to inline more largely than the portions on the front end side thereof. Accordingly, this also can prevent occurrence of bending deformation due to thermal contraction after the molding more effectively.

In the pedestrian protection apparatus 10 of this embodiment, both of the first connecting ribs 50 and the second connecting ribs 52 have a thickness that is thinner than that of the left and right side walls 24, 34, 26, and 36 of the first and second reinforcing beads 20 and 22. Therefore, contracting deformation of each connecting rib 50 and 52 during the thermal contraction after the molding completes earlier than contracting deformation of each of the left and right side walls 24, 34, 26, and 36 of both reinforcing beads 20 and 22. Therefore, for example, unlike the case in which contracting deformation (molding contraction) of both connecting ribs 50 and 52 and of the left and right side walls 24, 34, 26, and 36 occurs at the same time and continues for the same period of time, gradient deformation caused by the molding contraction of the left and right side walls 24, 34, 26, and 36 can be more reliably prevented by the connecting ribs 50 and 52 that have completed their contracting deformation.

In this pedestrian protection apparatus 10, the first connecting ribs 50 protruding upward and the second connecting ribs 52 protruding downward are positioned to align along a straight line in the left-to-right direction respectively on the reinforcing portion 18. Therefore, it can be prevented to the maximum extent possible that a difference in the connecting position of each connecting rib 50 or 52 relative to each reinforcing bead 20 or 22 causes a difference in the amount of gradient deformation caused by the molding contraction of the left and right side walls 24, 34, 26 and 36 of both reinforcing beads 20 and 22. Accordingly, it also prevent the occurrence of bending deformation due to thermal contraction after the molding more advantageously.

While the specific structure of the present invention has been described in detail above, for the illustrative purpose only, it is to be understood that the present invention is not limited to the foregoing description.

For example, only one of the plurality of first reinforcing beads 20 protruding upward and the second reinforcing beads 22 protruding downward may be respectively provided at the reinforcing portion 18.

When only the plurality of first reinforcing beads 20 protruding upward are provided at the reinforcing portion 18, only the first connecting ribs 50 are provided between adjacent first reinforcing beads 20. When only the plurality of second reinforcing beads 22 protruding downward are provided at the reinforcing portion 18, only the second connecting ribs 52 are provided between adjacent second reinforcing beads 22.

The number, space of arrangement, overall shape of the first reinforcing beads 20 or the second reinforcing beads 22 provided at the reinforcing portion 18 may be changed. The number, space of arrangement, overall shape or the like of the first connecting ribs 50 or the second connecting ribs 52 are suitably determined in accordance therewith.

The height, thickness and the like of the first connecting ribs 50 or the second connecting ribs 52 are not limited to those illustrated above.

While in the above embodiment, the first connecting ribs 50 on the reinforcing portion 18 are formed at positions more forwardly than the positions of the second connecting ribs 52 on the reinforcing portion 18, such formation positions are not particularly limited to this.

It is noted that, in addition to the pedestrian protection apparatus disposed inside of the bumper fixed on the front face of the automobile, the principle of the present invention can be advantageously applied to any pedestrian protection apparatus such as those disposed at the front face of the automobile independently of the bumper and those disposed in various forms on the front face of vehicles other than the automobile.

It is to be understood that the present invention may be embodied with various other changes and modifications which may occur to those skilled in the art, without departing from the spirit and scope of the invention.

What is claimed is:

1. A pedestrian protection apparatus for a vehicle, comprising: a resin base member which is disposed at a lower region of a front of the vehicle so as to extend in a front to back direction of the vehicle, which includes a front portion and a rear portion and is fixed at the rear portion to the vehicle; a plurality of reinforcing beads integrally formed at the front portion of the resin base member so as to be spaced apart from each other by a predetermined distance in a vehicle width direction, the plurality of reinforcing beads being extended in the front to back direction of the vehicle and having an angular U-shaped cross section that protrudes at least one of upward and downward; the apparatus being arranged to protect a leg portion of a pedestrian that has collided with the front of the vehicle by contact of a front end of the resin base member with the leg portion of the pedestrian,
wherein at least one planar connecting rib is vertically provided on a portion of the resin base member that is positioned between any adjacent reinforcing beads at the front portion of the resin base member, the at least one planar connecting rib being extended in a direction perpendicular to an extending direction of the reinforcing beads to connect and terminate at opposing surfaces of the adjacent reinforcing beads.

2. The apparatus according to claim 1, wherein the at least one planar connecting rib has a thickness that is thinner than that of the reinforcing bead.

3. The apparatus according to claim 1, wherein the opposing surfaces of the plurality of reinforcing beads adjacent to each other in the vehicle width direction are connected at end portion of the reinforcing beads via the at least one planar connecting rib.

4. The apparatus according to claim 1, wherein each of the plurality of reinforcing beads comprises a rear side wall, the rear side wall extending one of vertically upward, obliquely upward toward the front side of the vehicle, and obliquely downward toward the front side of the vehicle.

5. The apparatus according to claim 4, wherein the at least one planar connecting rib is integrally formed on an upper surface of the rear side wall extending obliquely downward toward the front side of the vehicle.

6. The apparatus according to claim 4, wherein the at least one planar connecting rib is integrally formed on a lower surface of the rear side wall extending obliquely upward toward the front side of the vehicle.

7. The apparatus according to claim 1, wherein the at least one planar connecting rib comprises a plurality of planar connecting ribs and are provided on the front portion of the resin base member, and wherein the plurality of planar connecting ribs are in alignment with each other in the vehicle width direction.

8. The apparatus according to claim 1, wherein the plurality of reinforcing beads are formed to protrude both of upward and downward at the front portion of the resin base member.

9. The apparatus according to claim 8, wherein the plurality of reinforcing beads protruding upward and downward are alternately provided in the vehicle width direction.

10. The apparatus according to claim 1, wherein the rear portion of the resin base member is spaced from the plurality of reinforcing beads.

11. The apparatus according to claim 1, wherein a notch is provided in the rear portion of the resin base member.

12. The apparatus according to claim 1, wherein the rear portion of the resin base member is a flat portion having a predetermined thickness.

13. The apparatus according to claim 1, wherein each of the plurality of reinforcing beads comprises a front side wall having a front surface, the front surface being made as an impact input surface to which an impact load generated by collision is input.

14. The apparatus according to claim 13, wherein a reinforcing rib is provided between any two reinforcing beads adjacent to each other in the vehicle width direction, the reinforcing rib being positioned so as to extend parallel to the front side wall of the reinforcing beads.

* * * * *